Oct. 25, 1927.
J. V. WECKBAUGH
1,646,802
MANUFACTURE OF PAPER CUPS
Filed Sept. 10, 1925
10 Sheets-Sheet 1
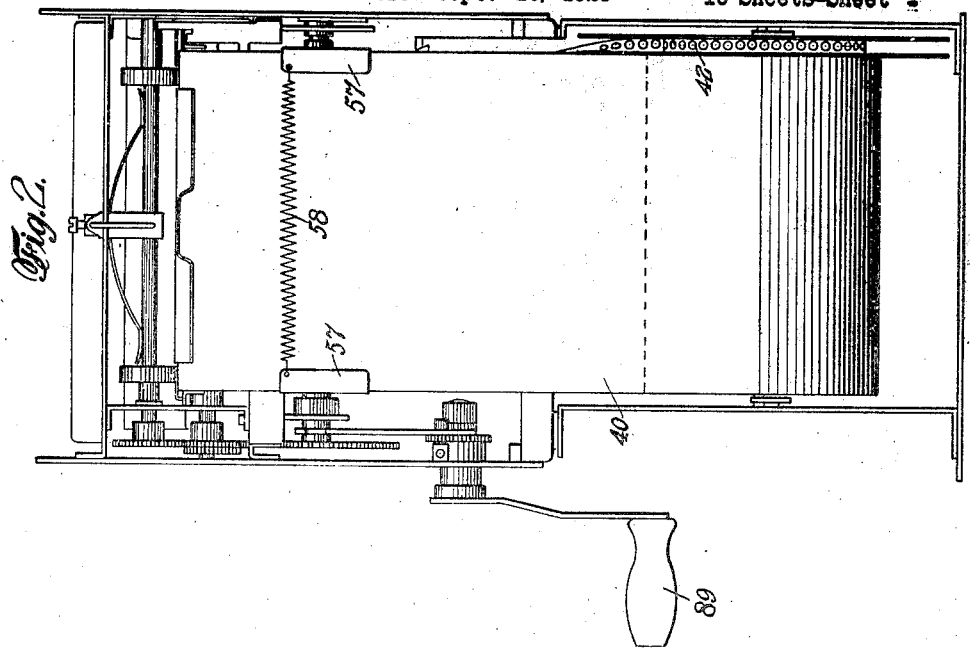
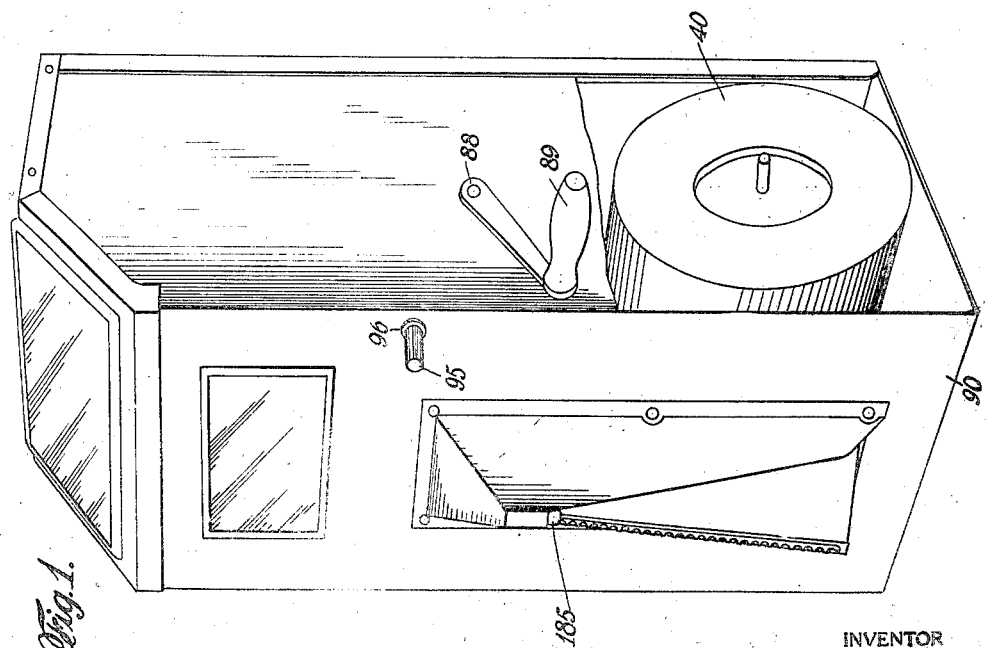
INVENTOR
Joseph V. Weckbaugh
BY
ATTORNEY Oct. 25, 1927.
J. V. WECKBAUGH
1,646,802
MANUFACTURE OF PAPER CUPS
Filed Sept. 10, 1925    10 Sheets-Sheet 2
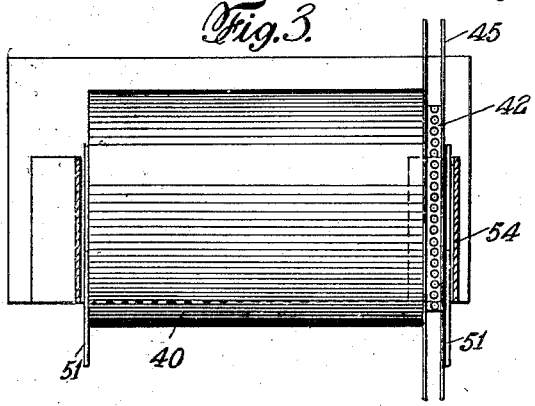
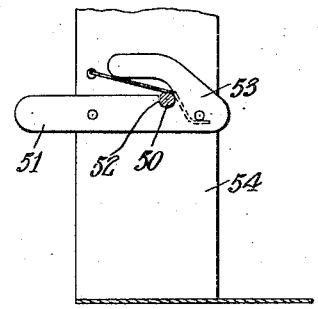
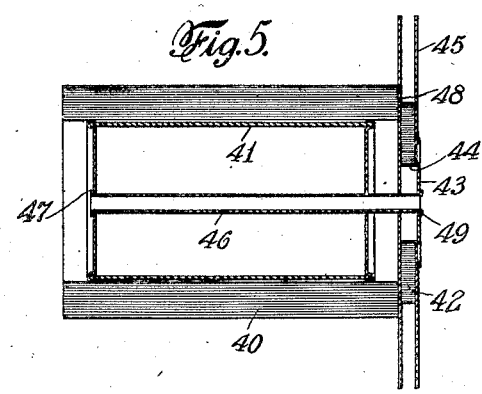
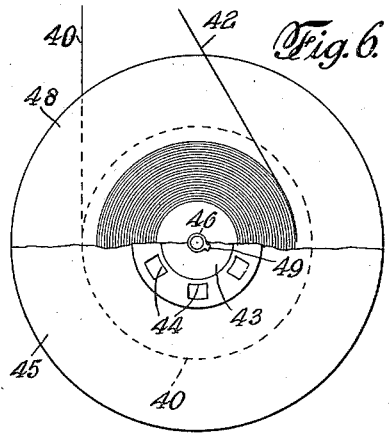
INVENTOR
Joseph V. Weckbaugh
BY
ATTORNEY

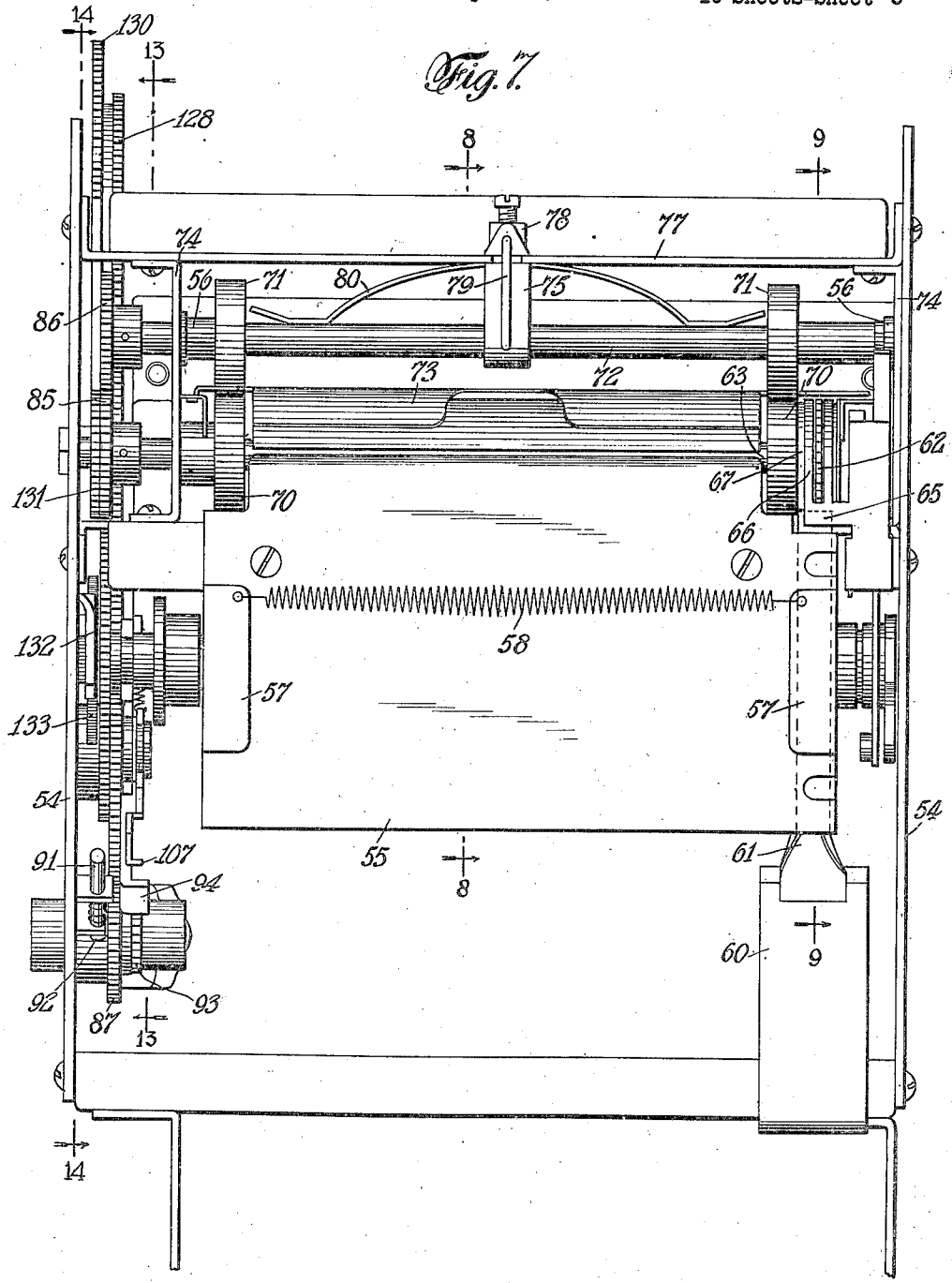

Oct. 25, 1927. 1,646,802
J. V. WECKBAUGH
MANUFACTURE OF PAPER CUPS
Filed Sept. 10, 1925 10 Sheets-Sheet 4
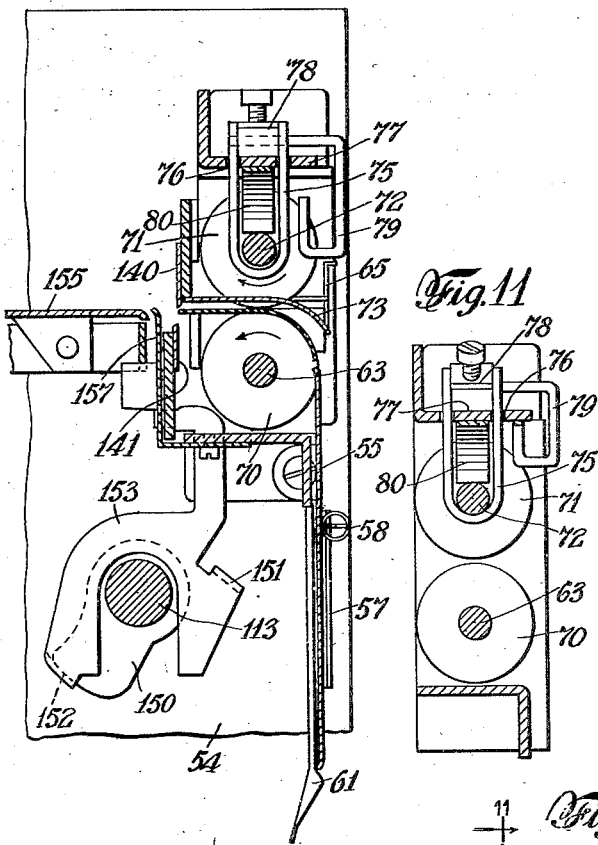
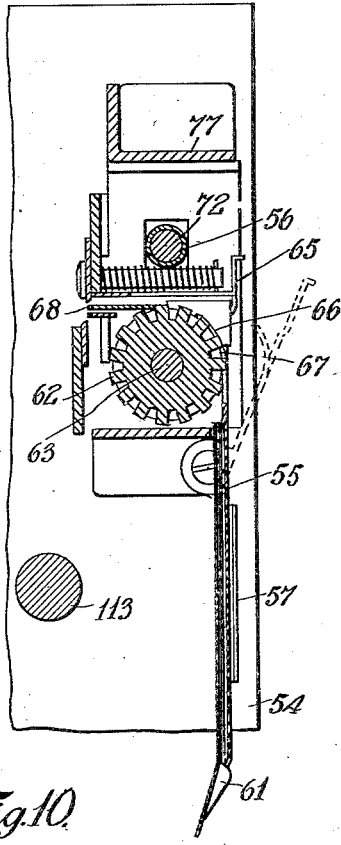
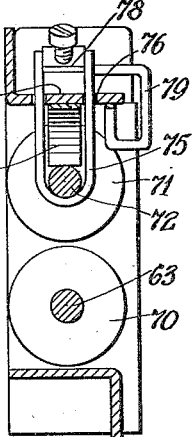
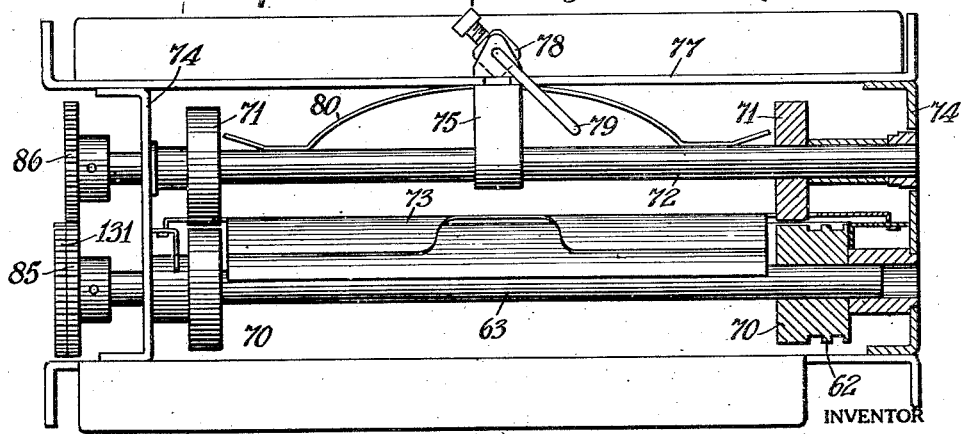
INVENTOR
Joseph V. Weckbaugh
BY
ATTORNEY

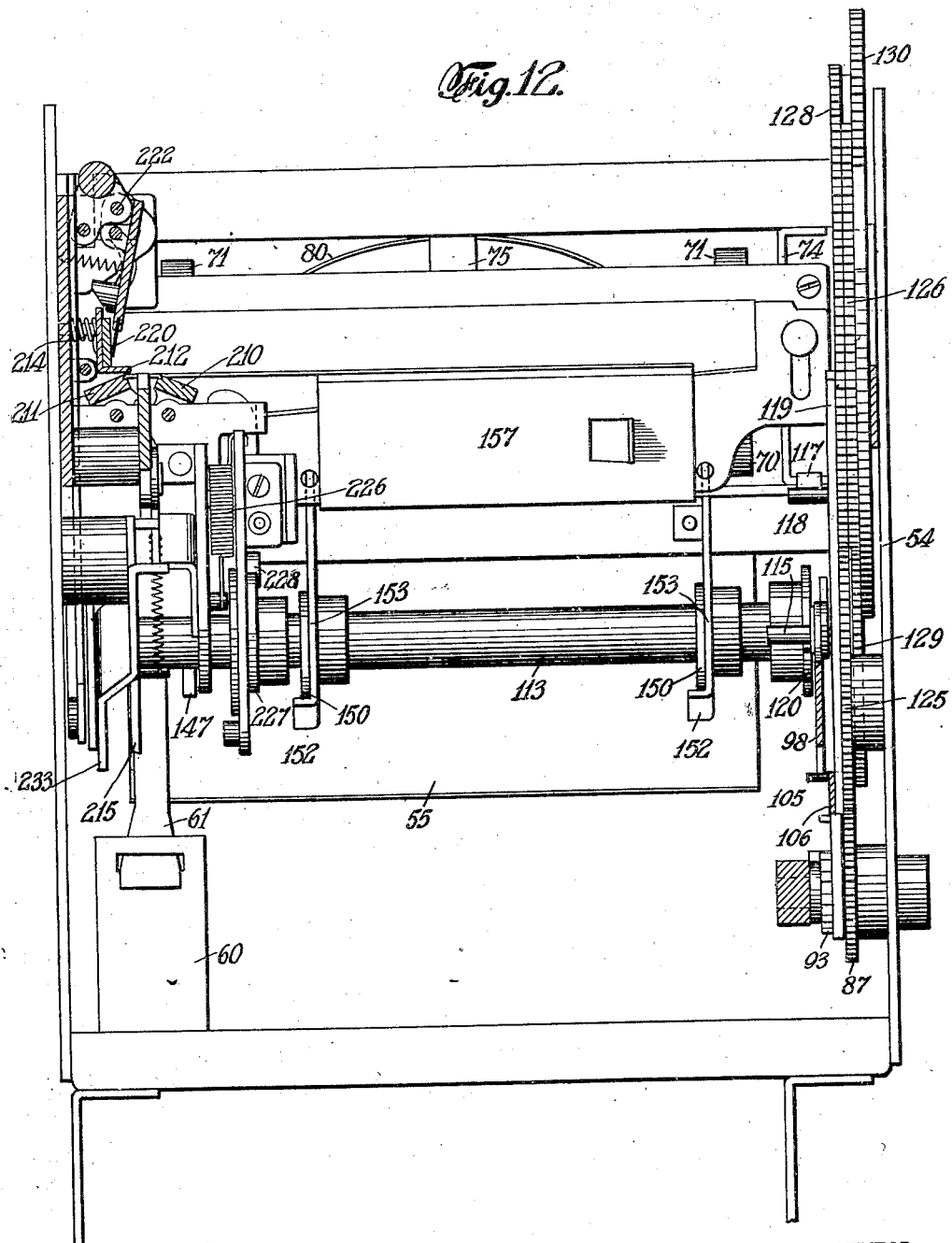

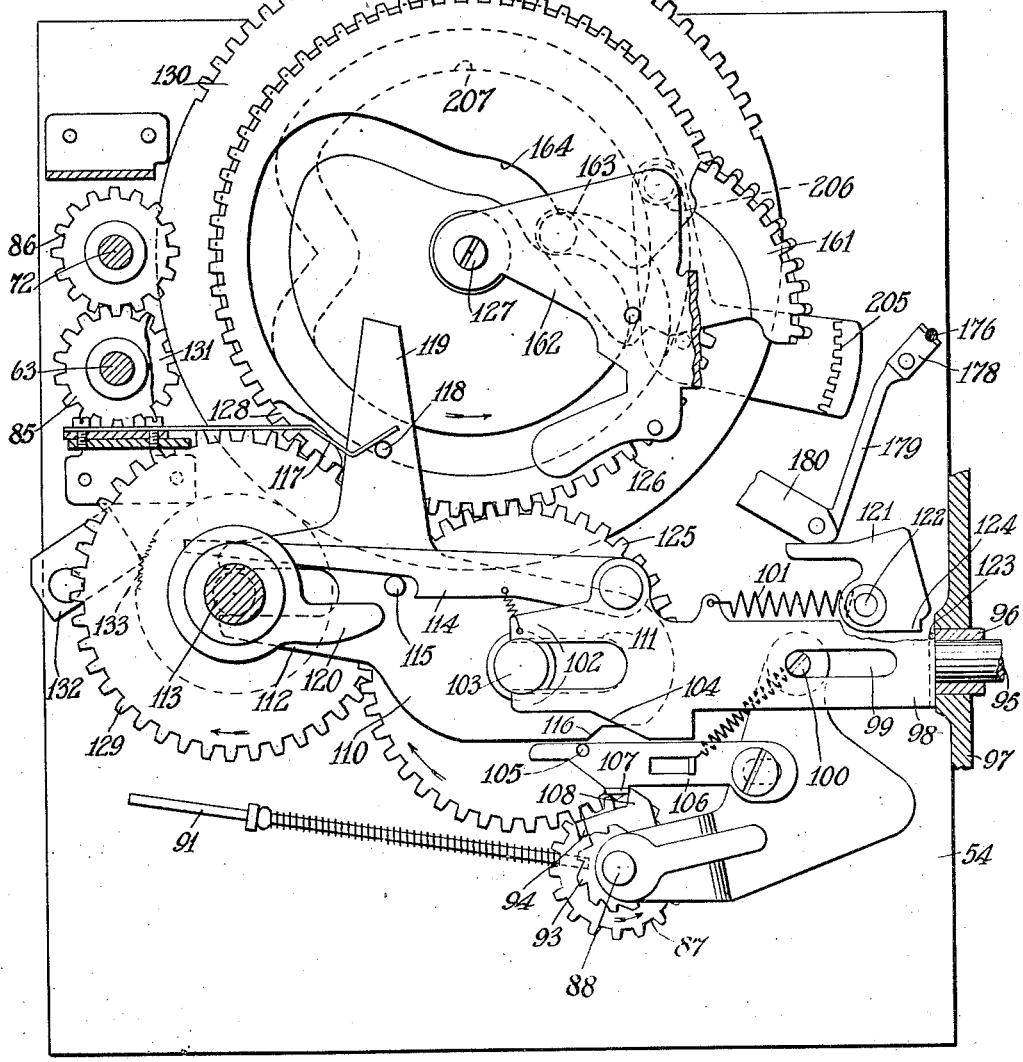

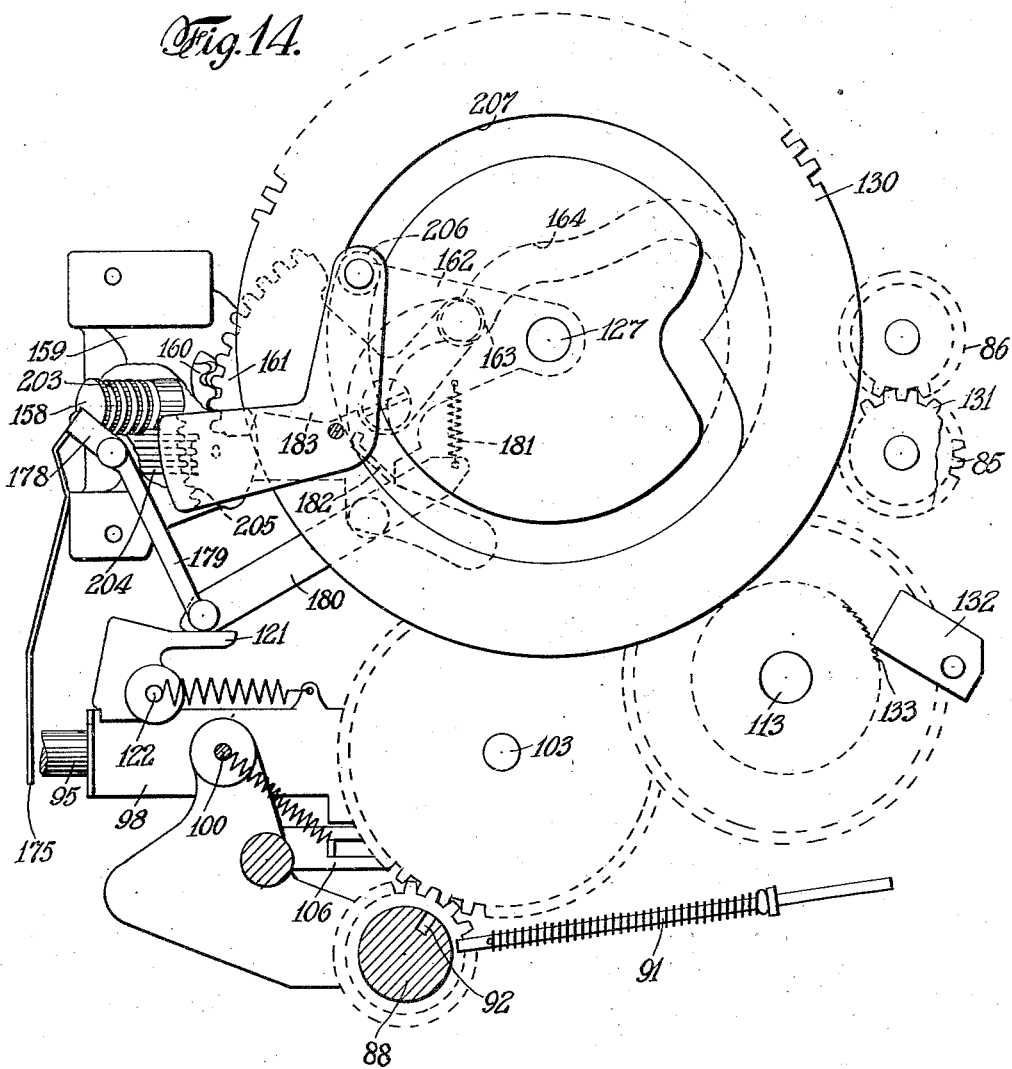

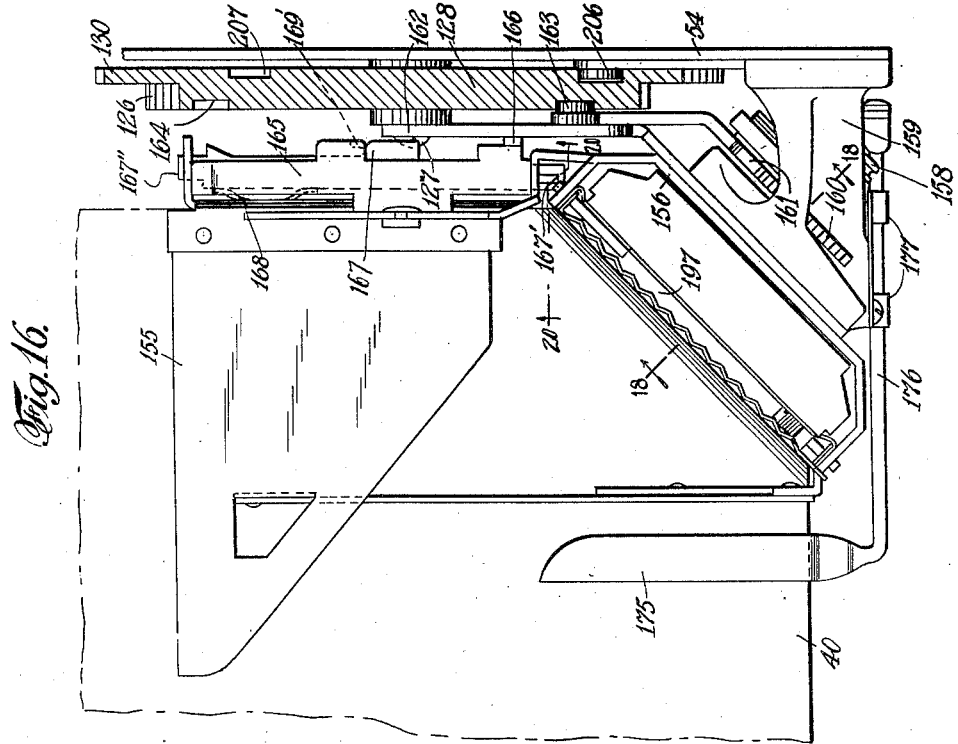
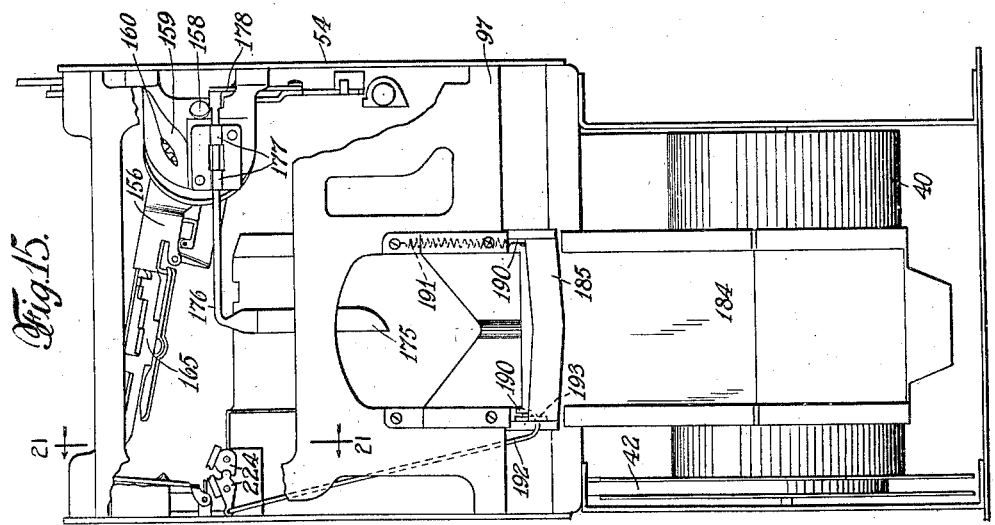

Oct. 25, 1927.
J. V. WECKBAUGH
1,646,802
MANUFACTURE OF PAPER CUPS
Filed Sept. 10, 1925
10 Sheets-Sheet 9
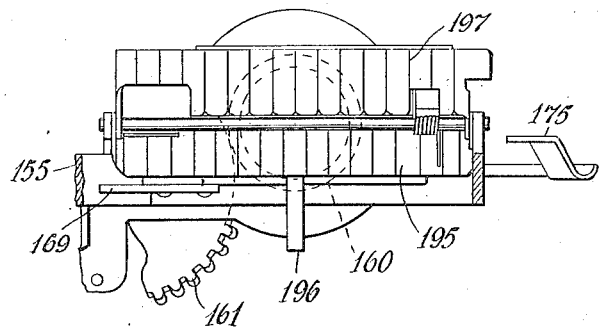
Fig. 17.
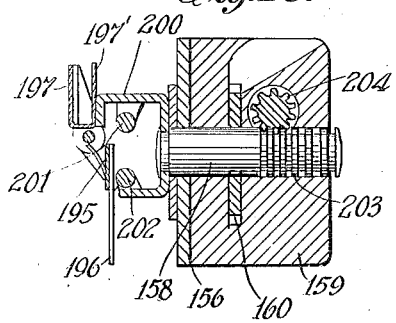
Fig. 18.
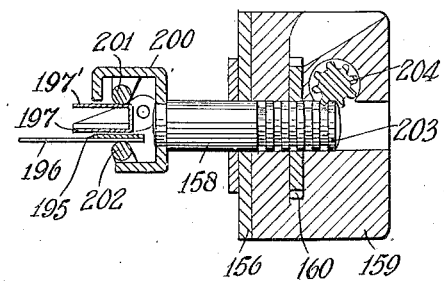
Fig. 19.
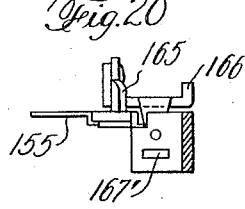
Fig. 20.
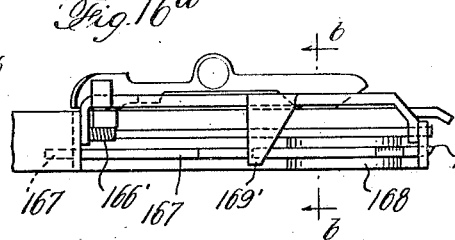
Fig. 16ª.
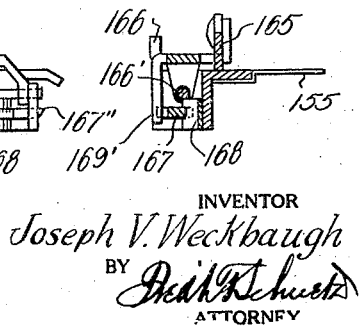
Fig. 16ᶜ.
INVENTOR
Joseph V. Weckbaugh
BY
ATTORNEY Oct. 25, 1927.

J. V. WECKBAUGH 1,646,802

MANUFACTURE OF PAPER CUPS

Filed Sept. 10, 1925  10 Sheets-Sheet 10

INVENTOR
Joseph V. Weckbaugh
BY
ATTORNEY

Patented Oct. 25, 1927.

1,646,802

UNITED STATES PATENT OFFICE.

JOSEPH V. WECKBAUGH, OF NEW YORK, N. Y., ASSIGNOR TO AMERICAN CUPTOR CORPORATION, OF NEW YORK, N. Y., A CORPORATION OF DELAWARE.

MANUFACTURE OF PAPER CUPS.

Application filed September 10, 1925. Serial No. 55,596.

The invention relates to a portable apparatus for the manufacture from a continuous strip of paper, and the dispensing thereof as required, of paper drinking cups or like articles, more especially of the type set forth in my prior Patent No. 1,421,114, and formed of a square blank of paper taken from a roll of the paper together with a pliable, perforated binding strip for securing adjacent edges of the blank.

In previous machines invented by me for making such cups and as set forth in my prior United States Letters Patent Nos. 1,359,772 and 1,574,324, there is disclosed mechanism embodying, generally, means for advancing such paper and metal strip, folding over a forward corner of the advancing paper, severing both paper and strip to provide a blank and binding strip of the requisite size, bending said blank about its diagonal to cause the cooperating lengthwise edges thereof to be brought in juxtaposition, then sealing the edges and binding over the same with the metal strip and clamping the same thereto, and finally ejecting the completed cup with metal edge presented foremost for convenient removal. The whole mechanism may be controlled from a suitable drive shaft which may be rotated by a crank manually, or by other means such as an electric motor. In the present invention I show various improvements not covered in the earlier cases.

In the accompanying drawings:—

Fig. 1 is a perspective view of the complete machine for manufacturing the cups, a portion of the casing thereof being broken away to disclose the interior.

Fig. 2 is a rear view of the apparatus with the casing removed and with the paper and metal strips in position.

Fig. 3 is a fragmentary section thru the stock supporting frame with supply of stock mounted therein.

Fig. 4 is a fragmentary transverse vertical section thru the roll supporting spindle and looking toward the support therefor.

Fig. 5 is a longitudinal section thru the roll of paper and binder strip stock.

Fig. 6 is an end view thereof with one half of the disk for binder stock removed.

Fig. 7 is a rear elevation of the upper part of the apparatus with paper and metal strips removed.

Fig. 8 is a vertical transverse section taken on the line 8—8, Fig. 7, looking in the direction of the arrows.

Fig. 9 is a vertical section thru the sprocket feed and guide for metal strip, taken on the line 9—9, Fig. 7, with the guide shoe in the open position indicated in dotted lines.

Fig. 10 is a detail elevation, partly in section, of the paper feed shaft and rolls thereon.

Fig. 11 is a transverse vertical section taken on the line 11—11, Fig. 10, looking in the direction of the arrows.

Fig. 12 is a transverse vertical section looking toward the rear of the apparatus.

Figs. 13 and 14 are longitudinal vertical sections taken respectively on the line 13—13 and 14—14, Fig. 7, looking in the direction of the arrows.

Fig. 15 is a front elevation of the apparatus with casing removed and portion of front frame plate broken away.

Fig. 16 is a fragmentary horizontal section taken above the table member for bending over the paper blank, with portion of the latter broken away, and with a guide finger shown in position over the paper strip.

Fig. 16ª is a fragmentary rear view of the paper-locking member; and Fig. 16ᵇ a transverse section thereof, the latter being taken on the line b—b, Fig. 16ª, and looking in the direction of the arrows.

Fig. 17 is a fragmentary front elevation illustrating the crimping mechanism.

Fig. 18 is a transverse vertical section therethru taken on the line 18—18, Fig. 16; and Fig. 19 is a similar view illustrating the operation of closing the crimping jaws.

Fig. 20 is a transverse vertical section taken on the line 20—20, Fig. 16, and looking in the direction of the arrows.

Figure 21:
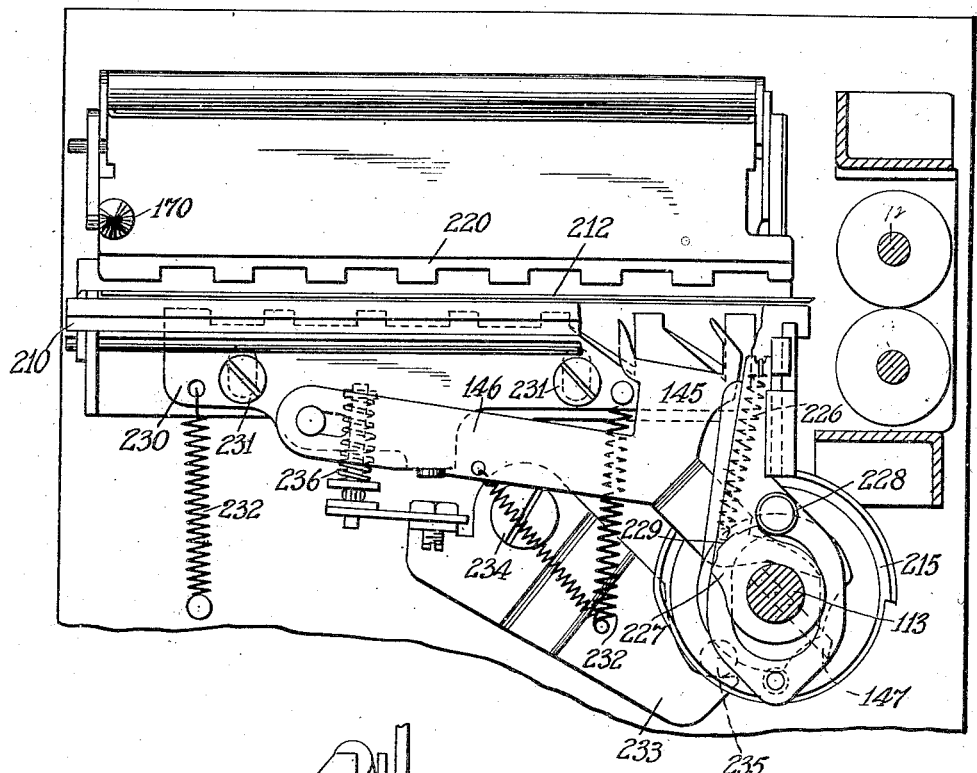

Fig. 21 is a fragmentary section taken on the line 21—21, Fig. 15, looking in the direction of the arrows.

Figure 22:
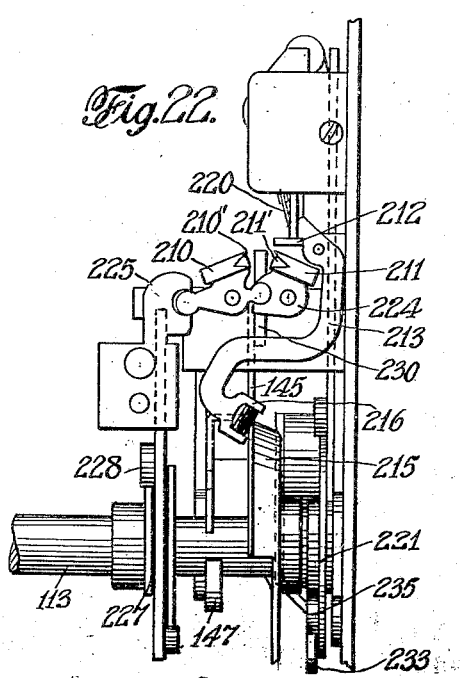
Figure 23:
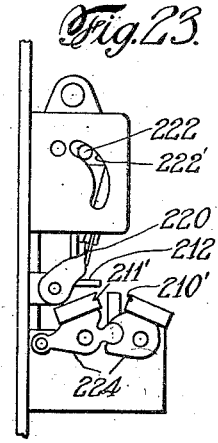

Figs. 22 and 23 are fragmentary views of opposite ends of the sealing mechanism.

Referring to the drawings, the cup which is to be substantially of the more or less conical shape indicated in my said prior patents, is to be manufactured from a supply of suitable paper material of the desired quality and size which is arranged to be taken from a roll 40 affording a sufficient quantity of such paper to make a very considerable number of cups with a single loading, for example, 1000 cups. The meeting edges of the paper are sealed with a perforated pliable metal strip which is supplied from a spool containing sufficient metal to take care of all the paper contained in the roll 40.

In the present embodiment of my invention, the roll of paper and the spool of metal are prepared in a single unit which may readily be inserted in the machine. Also, these two elements are wound in opposite directions, and provision is made for friction between the two, so that as they are simultaneously unwound, each will act as a brake to the other to prevent either roll from overrunning.

As shown in the drawing, the paper 40 is rolled about a cylindrical drum 41 which is somewhat shorter than the paper is wide. The metal strip 42 is wound on a hub 43 formed by striking out projections 44 from a flat disk of metal. Before the metal strip 42 is wound about these projections, a paper guide disk 45 is slipped over the hub. After the paper roll 40 and the metal strip 42 have thus been separately wound, a tube 46 having a flange 47 at one end is passed thru central perforations in the drum 41 and then thru a central opening in a paper friction disk 48. The hub 43 is then threaded over the tube 46 with the exposed face of the metal 42 against friction disk 48 and with the metal strip 42 running in the opposite direction to that of the paper roll 40. Flanges 49 carried by the tube 46 are then struck over and hammered down until both the paper roll 40 and the metal strip 42 are pressed against opposite faces of the friction disk 48. This assembly makes a compact self-tensioning unit which may conveniently be supplied to users of the machine.

To insert this unit in the machine, a spindle 50 is passed thru tube 46 and the ends of the spindle are rested on arms 51 (which likewise serve as guides for the paper and metal). The unit is then pushed into the machine until the ends of spindle 50 are engaged by spring sockets 52 of brackets 53 which in turn are secured to the frame walls 54.

Secured to the back of the frame is a transversely extending guide plate 55 which is located above the supply roll and over which the paper 40 is designed to be drawn, opposite lateral portions of the plate being turned over for the purpose of providing guides 57 confining the side edges of the paper strip to prevent lateral displacement thereof in its movement over the guide plate as well as to retain the strip as a whole thereto. A further means such as a coil spring 58, tapering towards its opposite ends from the middle portion, may be arranged to extend transversely over the advancing strip of paper intermediate the upper and lower ends of said guide plate and to press the paper lightly against said guide plate, the spring ends being conveniently attached to the lateral guides 57 of said plate. The said spring 58 will thus exert its maximum pressure over the middle portion of the paper and assist in insuring a uniform feed of the same to the cup forming mechanism hereinafter described.

Simultaneously with the feeding of the paper 40 the metal binding strip 42 is to be similarly advanced to the cup forming mechanism; and to this end it is guided upwardly from the spool (from which it is unwound in a direction reverse to that in which the paper is unwound) over a plate 60 to the mouth of a partly closed guide channel 61 constricted substantially to the width of the strip and passing behind the guide plate 55 for the paper strip. This guide channel terminates substantially tangentially to a feed sprocket 62 which is frictionally held on a feed shaft 63 and over the teeth of which the perforated metal strip is designed to fit, being advanced to the cup forming mechanism by said sprocket. The sprocket 62 has a snug frictional fit on its shaft 63, and it becomes possible, therefore, to turn same in a direction reverse to its normal forward-feed rotational movement, as in replenishing the supply of stock, simply by exerting a sufficient downward pull upon the said metal strip.

To insure the retention of said strip to its sprocket at all times during the operation of the apparatus, a spring pressed guide shoe 65 is pivotally secured to a side of the frame 54 to enable its withdrawal therefrom (as indicated by the position shown in dotted lines, Fig. 9) as when inserting a new supply of the strip. This shoe has a bifurcated portion 66 curved to conform to the periphery of the sprocket and its tines are adapted to straddle the teeth thereof and to press the metal strip upon the peripheries of the adjacent full portions 67. Beyond the ends of the tines, a further shoe 68 guides the strip to the cup forming mechanism.

The feed shaft 63, in addition to supporting the feed sprocket 62 for advancing the metal strip, has secured thereto a pair of feed rollers 70 separated from each other thereon to correspond to the width of the paper strip, said rollers being adapted to cooperate with a similar pair of rollers 71 which are mounted directly above the former and are secured on a shaft 72 disposed parallel to the said feed shaft. The strip 40 of paper is designed to pass between the two sets of rollers and to be advanced thereby into the cup forming mechanism—an arcuate guide member 73 being provided to direct the paper to these rollers.

The shaft 72, moreover, is so mounted as to admit of its being displaced slightly vertically (say $\tfrac{1}{16}''$) to cause the rollers 71 to move away from their coacting rollers 70, thereby allowing ample space to pass thru the paper in initially threading the same into the apparatus. To raise such shaft 72 for this purpose, the same is mounted at its ends in bearings 56 which move in slotted brackets 74 and is further carried by a strap 75 whose upper ends pass thru slots 76 of a transversely disposed and fixed bar 77. Between the projecting ends, moreover, is pivotally mounted a block 78 which may be oscillated slightly thru a handle member 79 to cam against the upper surface of the bar and raise thereby the projecting ends of the strap further thru said slots. Normally, however, the block will rest squarely against the upper surface of the bar and the strap will drop accordingly, being assisted to its lowermost position by a flat spring 80 interposed between the undersurface of the bar 77 and the shaft 72. The opposite ends of this spring bear upon said shaft near its opposite ends, while the intermediate portion of the spring is in contact with the underface of the said bar. Accordingly, there is thereby provided a substantially balanced pressure upon the cooperating pairs of rollers to secure proper feed of the paper.

Rotational movement is to be imparted to the said shafts 63 and 72 in timed relation to the other operations to be performed on the material in forming a cup therefrom; and to this end, gear wheels 85 and 86, respectively on the shafts 63 and 72, mesh together and are driven in turn from a driving pinion 87 thru intermediate gears, including also a cam groove and roller transmission, hereinafter more fully set forth.

The driving pinion 87 is arranged during operation of the machine to be locked to the driving shaft 88 which is rotatably mounted in the frame and is rotated in any suitable manner, for example, by means of a crank handle 89 secured to its outer end and outside of a casing 90 which incloses the entire apparatus, as shown more particularly in Fig. 1 of the drawings. The said handle may be merely screwed into the projecting outer end of the shaft, which shaft normally turns freely in either direction. When it is desired to remove the handle, as in transporting the apparatus, a spring-pressed rod 91, mounted along the inner face of the frame wall 54, may be pressed inwardly to locate in a recess 92 of the shaft and thereby temporarily lock the latter against rotation and permit the handle to be unscrewed from the end of the shaft by turning said handle in a direction reverse to that by which it was attached thereto.

Loosely mounted on the drive shaft 88 (see Fig. 13) is the said driving pinion 87; and rotatable with the shaft is a ratchet wheel 93, the latter being adapted to be engaged by a spring pressed pawl 94, pivotally mounted on the driving pinion 87. A setting plunger 95 projects thru the front of the casing 90 for convenient operation; and is mounted along the inner face of the corresponding frame wall for horizontal reciprocation. The said plunger for this purpose is guided in a bushing 96 carried by the front frame plate 97 and is provided with an extension 98, said extension having a slot 99 into which projects a guiding pin 100. The extension and plunger are spring drawn outwardly by a coil spring 101, normally to force the projecting plunger end into its outermost position; and at its innermost end the extension is bifurcated, the tines 102 thereof riding over a stud 103. Along its lower edge, the extension 98 is provided with a cam edge 104, the same being adapted to engage a pin 105 on a pivoted and reciprocable arm 106 which has a detent 107 on the lower face for engagement with a tooth 108 of said pawl 94. The arm 106, moreover, is normally spring-urged upwardly towards said cam face 104, but in the initial position before the plunger is pushed in, is held down by a second slidable member 110, so that pawl 94 is rocked out of engagement with ratchet 93.

As the plunger is pushed in, the slidable member 110 (which has a slot 111 into which the stud 103 fits, and also has a bifurcated end 112 fitting over a cam shaft 113) is moved inward thru the engagement of a notched arm 114 with a pin 115 projecting from said slidable member, said arm 114 being pivotally attached to the plunger extension 98. The member 110 is held at the full limit of its movement by a flat spring 117 bearing upon a pin 118 projecting from an arm 119 extending upwardly from said slidable member 110 so that when plunger 95 is released, member 110 will remain in its inner position. When plunger 95 is first pushed in, cam edge 104 will ride over pin 105 still holding down arm 106. However, when plunger 95 springs out, leaving member 110 in the inner position, arm 106 will rise with its nose behind cam face 116, formed on the lower edge of member 110, and with pin 105 in front of cam face 104.

The arm 106 is thus raised sufficiently for its detent 107 to clear the tooth 108 on the pawl 94 and said pawl 94 drops into the ratchet wheel 93, thereby connecting the shaft 88 to the driving pinion 87 so that, in rotating the handle 89 in the driving direction, movement is transmitted therefrom thru the train of gearing, hereinafter described, to the stock feed gears 85 and 86 and to the mechanism for effecting the other necessary operations.

After the completion of the various operations, further rotation of the handle effects the return of the slidable member 110 to its normal position thru the engagement with the pin 115 of a cam arm 120 rotatable with the cam shaft 113. Arm 106 is thereby cammed downwardly (thru action of cam face 116) with its detent ahead of the pawl tooth 108, rocking the pawl to a position above its position of engagement with the ratchet 93, and thus releasing the pinion from its driving shaft and locking the said pinion also against further forward movement. Until this condition is restored, by again pushing inwardly the plunger 95 with auxiliary mechanism, the machine cannot be operated, the handle merely rotating freely in either direction.

There is provided, moreover, in the line of movement of the said plunger a latch member 121 which is pivoted to the frame wall 54 on a stud 122 located at right angles to the said plunger. The said latch is held normally in elevated position out of the path of movement of the plunger thru engagement of one arm thereof by a link member 179 hereinafter described. A stop or projection 123 on the plunger normally clears the latch member, but after the operations have been initiated by pushing in the said plunger 95 (which is returned immediately under spring action) and by turning the handle 89, the link member rises and releases the latch 121. Arm 124 of the latch 121 then drops under the action of gravity into a position in front of the stop 123 and prevents inward movement of said plunger until all the operations required to complete and discharge a cup have been performed. The link member 179 then again engages the latch member to clear the plunger for further operation.

The gear train for communicating the movement from the pinion 87 to the various mechanisms, comprises a gear wheel 125 which is rotatably mounted on the stud 103 and meshes with a further gear 126 on a stud 127. This latter gear has connected thereto, on said stud 127, a multilated gear 128 adapted to mesh with a gear 129 on the cam shaft 113, whereby the latter is driven in proper timed relation. Said gear 126, also, carries with it on stud 127 a further mutilated gear 130 which is adapted to mesh with a gear 131 on the feed shaft 63; and thru the rotation of said gear, the gears 85 and 86 are rotated at the proper time to feed forward sufficient stock for manufacturing one cup. Moreover, a pawl 132 engages with the teeth of a ratchet wheel 133, rotatable with the cam shaft 113, so that it is possible to rotate the cam shaft in the proper driving direction only.

After the paper and metal strip have been fed past the rollers 70 and 71, they pass between the blades 140 and 141 of the shearing mechanism; and their advance is continued in a horizontal plane until the amount of paper fed beyond said blades is equal substantially to the width of the paper strip, that is to say, a square of the paper is rendered available to provide a blank from which the cup is to be formed. At the same time, the metal strip has been fed along beneath the paper near one edge thereof, though a lesser distance, because the effective periphery of its feed sprocket is of lesser diameter than the cooperating peripheries of the pairs of feed rollers. It is desirable, also, to impart an additional movement to the several metal strip and substantially in the direction of its feed movement. This obviates the presence of a sharp metal edge or point at the immediate apex of the completed cup which might be objectionable under certain conditions and might interfere with the delivery of a finished cup from the machine.

To effect this slight additional movement of the metal strip at the proper time, use is made of a pivoted and reciprocable double-toothed member 145 (see Fig. 21) which is projected upwardly into the path of travel of said strip, its teeth passing thru two corresponding perforations thereof. It is then given a forward throw by its spring-drawn reciprocable and oscillatable lever arm 146 to advance the cut-off piece of the strip the desired amount. The extent of throw is determined by the shaped under edge of the lever 146, the same being adapted to be engaged at the proper time by an arm 147 carried by the cam shaft 113.

To cut off the paper and metal stock at the proper time to insure the required length, the blades 140 and 141 (see Fig. 8) are brought into action in timed relationship to the feed of the paper, by the said cam shaft 113, thru the operation of a pair of cams 150 rotatable with said shaft and engaging projections 151 and 152 on vertically slidable disks 153 which are slotted and mounted for reciprocation on said shaft. During a portion of the rotation, the lower blade 141 of said blades is moved upwardly and thereby toward the upper and stationary blade 140 to sever from the paper and metal binding strip a portion of the required length for constructing therefrom a cup; whereupon, further rotation of the cam member 150 taking place, the said blade 141 is withdrawn to its normal position allowing of subsequent supplies of paper and metal stock being fed between the said blades toward the cup forming mechanism.

As the stock is fed past said blades, a support is provided therefor in its path of travel into the cup forming mechanism. This support is in the nature of a triangular blade or table member 155, which is part of bending member 156 and which is arranged to be located substantially in the plane of the advancing paper. An upstanding plate 157 is located beyond the shearing members 140 and 141 and has its upper edge curved over in the direction of said table to serve as a guide to eliminate any possibility of the edge of the paper going over the table instead of on top of it.

This table 155, normally, is located at the forward portion of the apparatus at one corner, as indicated in Fig. 16; but is arranged to be rotated over into the position at the diagonally opposite corner and returned to its initial position as follows:

Said table is rotatably mounted on the axle 158 of a block 159 which is secured to the frame plates 54 and 97 at the forward portion of the apparatus and at the corner adjacent the normal position of said table. Axle 158 carries a gear wheel 160 with which is arranged to mesh a segmental gear wheel 161, the latter being pivoted to swing about a stud on a bracket 162, which bracket in turn is fixedly attached to the stud 127 and the block 159. The segmental gear 161 is provided with an arm carrying a roller 163 (see Fig. 13) fitting within a cam groove 164 provided in the face of the gear wheel 128, the characteristics of which groove are such that the table will be swung into position at the proper time to support the paper being fed thereover as well as on its return movement to bend the paper blank over to bring its lengthwise edges into juxtaposition.

After the completion of the feeding action and just prior to the severing of the blank from the stock, a lateral pivoted guide member 165 (see Figs. 16, 16ª, 16ᵇ and 16ᶜ) carried by the bending member 155, is turned over the advancing edge of the paper; and then, when the proper amount of paper has been fed forward, is locked to the said table or bending member. The first action of this guide member, namely, being brought over the edge of the paper, is accomplished thru a rear, upwardly-directed projection 166 engaging the outer face of the bracket 162 to thereby rock the pivoted locking member over into position above the paper. Subsequently thereto said member is depressed to the paper, locking the same between it and the table to secure a good hold on the paper during the severing of a blank, and also for holding the blank in position during the subsequent bending operation. The said locking member is normally spring urged away from the table surface by means of a spring 166' but is held in the position to guide the advancing paper strip, during a definite period, thru the aforesaid engagement between its projection 166 and the face of the bracket 162. The final locking movement toward the table top to clamp the paper thereto is accomplished by a bar 167, slidably mounted in the table below the locking member and having a spring 168 acting thereon and urging the same outwardly, thru engagement of its projecting end 167' with an arm or nose 169 (Fig. 17) of a movable carriage of the folding member when the carriage is moved as hereinafter set forth in connection with the crimping operation. Thus, when the said bar is moved in one direction, the locking action will be accomplished and maintained by the spring 168 pressing bar 167 against a finger 169'; and this condition will obtain, due to the wedging action of the bar, until the latter is released after movement of the table has bent over the paper blank and placed its edges in juxtaposition and just prior to the sealing of these edges. As a binding member 220, hereinafter described, descends it carries with it a projection 170 (Fig. 21) for engaging the protruding end 167" of the bar 167 opposite the one previously engaged to set the lock, and forces inwardly the said bar to release thereby the locking member from its hold on the paper and table.

A guide finger 175 is also provided, under which the paper is adapted to pass as it is fed into the forming mechanism. This finger is carried by a rod 176 mounted to rock in bearings 177 secured to the block 159, the opposite end having an arm 178 (see Fig. 14) connected by a link 179, with one arm of the lever 180 which is pivoted to the said bracket 162. The link 179 also engages latch member 121. The other and inner arm of said lever 180 is spring-drawn upwardly by means of a spring 181; and, furthermore, has extending upwardly an auxiliary arm 182 turned over at its end for engagement with the lower edge of an arm 183 of the segmental gear 161.

At the time the paper is being fed into the forming mechanism, arm 183 presses against arm 182 to hold finger 175 in position to have the paper pass under it. As gear 161 starts to move, arm 183 tends to move away from arm 182 and permits spring 181 to exert pressure to draw finger 175 downwardly. This insures the paper taking the correct position and prevents any possibility of buckling. The spring pressure of finger 175 remains in effect until the cup is fully formed and released; whereupon this pressure serves forcibly to eject the cup into an outlet chute 184. As gear 161 moves back to bring the bending members into position to receive another blank, arm 183, by pressing against arm 182, will raise finger 175 into the position first described.

The cup is held in chute 184, with mouth down and bound edge protruding, by contact of its tip against an oscillatable retaining strip 185. The said retaining strip 185 is arranged to be lifted slightly to release the cup when the apparatus is operated to make a subsequent cup, in order to prevent jamming in the chute, said completed cup then falling out under the action of gravity if it has not previously been removed.

This is accomplished by pivoting said strip 185, (which is shaped to the form of an angle with vertex forwardly directed) to ears 190 extending downwardly from the front plate of the frame, a spring 191 serving normally to hold the strip depressed for retaining a cup in the chute. The extent to which this strip may be depressed for holding a cup, as shown in Fig. 1, with metal bound edge resting against the inner surface of said member 185, is determined by a wire or rod 192 which fits thru a slot 193 of the strip and is movable therein. The said wire 192 is connected at its opposite end to one of a pair of binding jaws for the edges of the cup and which is hereinafter more fully described. Thru the movement of this jaw member, which also is imparted to the wire 192, the strip is drawn upwardly to release the cup or is allowed to move downwardly to a position for retaining a cup in the chute.

As the paper strip is fed forward, it is preferred to fold it over at one of the forward corners, this corner being creased to provide a turned over edge at the mouth piece of the finished cup, said operation being completed prior to the bending over of a blank. During the forward movement of the strip, the corner thus to be folded over encounters a corrugated surface 195 (see Fig. 17) of one of a pair of crimping members and is deflected thereby downwardly as the paper strip is fed forward. Further movement causes the front edge of the advancing paper strip to encounter a guide piece 196 which assists in the folding action. As a reaction from the deflection of a corner in this way the central portion of the strip would naturally tend to buckle up, but this is prevented by finger 175. After the proper amount of the paper strip has been fed forward and the corner turned downwardly the desired amount—substantially at right angles to its original position, the upper surface 197 of the crimping members closes down upon the lower surface 195; and, being also corrugated, cooperates with the lower member to provide a series of impressions therein as well as creasing over the edge of the turned down portion. This is accomplished by the forward movement of a carriage 200 movably carried on the bending member 156 and bearing a pair of rollers 201 and 202, the jaw 197 being U-shaped with an extension wall 197'. The two said rollers are designed to embrace the two respective jaws 195 and 197 as the carriage is advanced to bring the same together over the turned over corner of the strip of paper advanced thereto. The movement of the carriage 200 is effected by moving axle 158, which for this purpose has been provided over a portion of its length with a cylindrical rack 203, by a gear wheel 204, engaging said rack, the former in turn being rotated at the proper time thru engagement with a segmental gear 205. This gear is pivoted to one of the frame walls 54 and carries a roller 206 adapted to fit a cam groove 207 in the back face of the gear 130. While this action has been going on and the paper thus held at the forward corner, as well as along the one edge by the locking and guide member 165, and along its opposite lateral edge in manner hereinafter set forth, the blank is severed from the strip, as hereinbefore set forth. Thereupon, the blank, cut to the proper size, is bent over and about its diagonal by the bending member until its lengthwise edges are brought into juxtaposition.

The perforated metal binding strip 42 has in the meantime been advanced simultaneously with the paper strip and beneath the side thereof at a slightly less rate, due to the smaller effective diameter of its feed sprocket 62; and is guided between the two jaw members 210 and 211 by respective angular longitudinal recesses 210' and 211' disposed therein opposite to each other. After having been severed together with the paper strip, it is advanced a slight distance relatively thereto by the member 145 as hereinbefore set forth.

A clamping bar 212 is provided to hold the edge of the paper opposite member 165. This bar extends substantially the length of the blank, and is carried by one arm of a bell crank 213. Springs 214 urge this bar towards the surface of jaw 211, and to insure the ends of the bar 212 pressing against this jaw to hold the corner of the blank, I prefer slightly to bow up the middle of bar 212. As the paper is being fed forward, the bar 212 is maintained in an elevated position by the action of a cam 215 rotatable with cam shaft 113 and bearing against the free arm 216 of the bell crank 213. As soon as the feeding action has been completed, bar 212 is released to hold the paper during the bending operation, but is again raised by the same cam as soon as the two juxtaposed edges are gripped by the binding mechanism as will later be described.

The paper blank after having been severed from its strip, is held at one of its forward corners by the crimping jaws 195 and 197 which have been closed over it and the impressions made therein and is also held along one edge by the clamping bar 212 and along the other edge by the holding device of the bending over member 156. The aforesaid crimping jaws are then opened and the blank bent over by said member 156 substantially about its diagonal; and it is to be noted that no crease is formed along the diagonal, so that a conical cup is formed. This brings the two lengthwise edges of the blank into juxta-position, the bent-over edge lying above the clamping bar 212 while the other edge is beneath said bar and still clamped thereby to the upper surface of the jaw member 211, with the perforated metal strip beneath both edges, in the recesses 210′ and 211′. The blank and strip are now in position for the final operation of locking the two edges together and binding them with the metal strip.

This is effected by a thin toothed plate or tucker member 220 extending along the jaws above the same and slightly to one side, said member being adapted to be drawn downwardly and forwardly by the action of a cam 221 on the cam shaft 113, the toothed plate member having pins 222 at its respective ends to fit arcuate guide slots 222′ to direct the said plate accurately into the space between the two jaws 210 and 211 and over the clamping bar 212. Plate 220 will thus press the two juxtaposed edges of the paper against the metal strip, and thereupon bar 212 releases the lower of these edges, but this edge will now be held in place due to the fact that one edge of table 155 is pressing it down against jaw 210. Further downward movement of plate 220 will bend the metal strip longitudinally into a V-shape, and will bend and tuck the marginal portions of the two edges of the paper into the V of the metal. During its downward movement, plate 220 likewise releases member 165 through the engagement of projection 170 with the end of bar 167.

As soon as the paper is tucked down into the bent metal it is desirable firmly to crimp the metal in place. To accomplish this, the jaws 210 and 211 are brought together during the final downward movement of plate 220 and draw the entire cup bodily over so that the paper will not slip from under plate 220. The jaws are brought together working simultaneously thru interlocking end members 224, one of the two pairs being engaged by an arm 225 to be moved upwardly in opposition to a spring 226, which normally maintains the said jaws apart. The upward movement of the arm 225 is imparted to it by the action of a cam 227 which bears against a roller 228 carried by the arm. It will be noted that the active surface of the said cam to close the jaws has an intermediate portion 229 somewhat higher than the adjacent portions, whereby after the said jaws have been brought together by the approaching adjacent surface, a further closure is effected by the intermediate portion 229 to give an additional pinch to the edges turned over and bound.

I do not however rely solely on the action of the jaws to hold the metal in place. It may be noted that when the metal strip is bent along its median line, the portions which lie between the perforations when the metal is flat, will form narrow projections. If some of these projections are upset, the metal will be firmly locked to the paper and the resulting cup will be much stronger. This upsetting is, in the present example, accomplished thru the action of the toothed member or anvil 230 whose teeth are spaced to come between the teeth of plate 220. During the final downward movement of plate 220, while the jaws 210 and 211 are closing, the projections on the upper surface of anvil 230 will strike at intervals against various of the portions of the metal strip which are between the perforations and now appear like teeth or projections. The projections so struck, together with the paper embraced between them, will be pushed upward and flattened into an approximate T shape (in cross section) thereby effectively locking the strip in place.

The anvil 230 is held in place by screws 231 which pass thru slots permitting the anvil a limited vertical movement. Normally the anvil is held in its lower position by springs 232. However, after jaws 210 and 211 have closed, a cam arm 233 pivoted on a stud 234 is moved by a cam roller 235 carried by cam shaft 113, to exert upward pressure on the anvil thru the medium of a short, stiff spring 236. At this time the anvil will not be able to move upward any substantial distance as it will strike against the under surfaces of jaws 210 and 211. As these jaws open thru the action of the same mechanism which closed them, they will clear the upper face of anvil 230 which will be suddenly shot upward by the action of spring 236 and will cooperate with finger 175 to eject the finished cup into the chute 184. As soon as roller 235 clears the end of cam arm 233, springs 232 will draw anvil 230 back to its lower position.

The manufacture of a paper drinking cup by the apparatus hereinbefore set forth thus involves the feeding of a continuous strip of paper simultaneously with a strip of binding metal to the cup forming mechanism, the same being directed over the table 155 and beneath the guide finger 175. This feeding operation is accomplished respectively by the action of the cooperating pairs of feed rolls 70 and 71 and the sprocket 62, which in turn derive their rotational movement from the driving pinion 87 actuated thru the medium of the crank handle 89. As set forth, it is not possible to operate this handle to drive the pinion 87 and associated mechanism until the setting plunger 95 has first been pressed inwardly and released; but I do not wish to be understood as restricting the control of the apparatus to such preliminary operation, as it is evident that in some instances it may be desirable to dispense with the setting action entirely and initiate the cup forming operations directly from the crank handle or other sources of power.

Thru the train of gearing operated by the pinion 87 there is rotated also at the proper time the cam shaft 113 which carries the various cams for actuating in proper sequence the different mechanisms employed to cut suitable blanks from the strip of paper and from the binding material, and then forming therefrom the cup, as well as delivering the said cup for use.

The paper blank and metal strip after having been severed by the knives 140 and 141 to form the blank and the one forward corner of the paper blank folded over by the crimping jaws 195 and 197, the said blank is then bent over about its diagonal to bring its lengthwise edges into juxtaposition, the metal strip having in the meantime been given a slight additional forward movement by the toothed member 145 engaging its perforations. The guide finger 175 has also maintained a slight downward pressure upon the blank during this bending over operation in order to obviate any buckling of the blank which is held along one edge to the table and along the other edge to the jaw member 211. There remains then merely the sealing of the juxtaposed edges and binding of the same with the metal strip. This is accomplished by the descent of the tucker member 220 drawing said edges (which are now released and the cup drawn over bodily) into the space between the jaws 210 and 211, which jaws then pinch the metal strip about said edges, the same being further secured thereto in upsetting portions of its edge thru the action of the tucker teeth on the anvil 230. The latter, as the jaws open to release the finished cup, springs upwardly to cooperate with the finger 175 in ejecting said cup into the delivery chute 184 where it is held by the retaining strip 185 in inverted position with metal bound edge foremost. The completed cup remains thus until removed or until released by the lifting of the retaining strip as the manufacture of another cup is begun.

I claim:—

1. In a cup making machine of the character set forth: operating mechanism for effecting the manufacture of a cup; a reciprocable plunger for setting the operating mechanism; and means controlled by said operating mechanism to block subsequent setting of the plunger until said mechanism has been restored substantially to its initial condition.

2. In a cup making machine of the character set forth: operating mechanism for effecting the manufacture of a cup; a reciprocable plunger provided with a projection and adapted for setting the operating mechanism; a pivoted latch member adapted to engage with said projection to block movement thereof in one direction; and means controlled by the operating mechanism and engaging said latch member to set the same in position for engagement with said projection of the plunger for temporarily blocking movement in one direction thereof.

3. In a paper cup making machine comprising operating mechanism for effecting the manufacture of a cup, the combination of a driving shaft, a pinion loosely mounted thereon, a pawl mounted about said shaft on said pinion, a ratchet wheel rotatable with the shaft and adapted to be engaged by said pawl for connecting the pinion to the shaft, a plunger slidably mounted in the machine, and mechanism associated with the plunger to control the engagement between the pawl and ratchet.

4. In a paper cup making machine comprising operating mechanism for effecting the manufacture of a cup, the combination of a driving shaft, a pinion loosely mounted thereon, a pawl mounted about said shaft on said pinion, a ratchet wheel rotatable with the shaft and adapted to be engaged by said pawl for connecting the pinion to the shaft, a plunger slidably mounted in the machine, means operated by the plunger to lock the pawl and ratchet in driving engagement, and means controlled by the rotation of the driving shaft to restore same to normal disengaged position.

5. In a paper cup making machine comprising operating mechanism for effecting the manufacture of a cup, the combination of a driving shaft, a pinion loosely mounted thereon, a pawl mounted about said shaft on said pinion, a ratchet wheel rotatable with the shaft and adapted to be engaged by said pawl for connecting the pinion to the shaft, a plunger slidably mounted in the machine, a detent lever controlled thereby and provided with a tooth, and means to move the detent lever to position its tooth respectively out of the path of the pawl and also to engage said pawl to locate the latter in a position of disengagement with the teeth of the ratchet.

6. In a paper cup making machine comprising operating mechanism for effecting the manufacture of a cup, the combination of means to feed forward a strip of paper, a table and bending member over which said paper is adapted to pass, a guide member adapted to be rocked over one of the lateral edges of the advancing strip, means to lock same to the table at the completion of the forward movement of the paper strip, and means to release said locking member.

7. In a paper cup making machine: means to feed forward a strip of paper, a table and bending member over which said paper is adapted to pass, means to fold the corner of the advancing strip of paper, a guide member adapted to be rocked over one of the lateral edges of the advancing strip, means controlled by the folding mechanism to lock the strip of paper to the table at the completion of the forward movement of the said strip, and means to release said locking member.

8. In a paper cup making machine: means to feed forward a strip of paper, a table and bending member over which said paper is adapted to pass, means to fold the corner of the advancing strip of paper, a guide member adapted to be rocked over one of the lateral edges of the advancing strip, means controlled by the folding mechanism to lock the strip of paper to the table at the completion of the forward movement of the said strip, sealing means for the edges of the paper, and means controlled by the movement of the said sealing means to release said locking member.

9. In a paper cup making machine comprising operating mechanism for effecting the manufacture of a cup, the combination of means for advancing a strip of paper and a strip of pliable perforated metal and means to sever same for affording a blank from which to construct the cup and a binding member for the edges thereof, and means to engage the perforations of said metal strip after the same has been severed and to advance same relatively to the paper blank.

10. In a paper cup making machine comprising operating mechanism for effecting the manufacture of a cup, the combination of means for advancing a strip of paper and a strip of pliable perforated metal and means to sever same for affording a blank from which to construct the cup and a binding member for the edges thereof, a lever having one arm bifurcated and whose tines are adapted to fit the perforations of said metal strip, a rotatable cam shaft, and means thereon to engage the other arm of said lever to cause the said tines to engage the perforations of said strip and to move the arm to also advance the said strip.

11. In combination, means for feeding a strip of paper, means for deflecting one corner of the strip during the feeding movement, means adapted during the feeding movement to hold a central portion of the sheet against being displaced by the reaction caused by said deflecting means and likewise adapted to move said central portion out of its plane after the deflecting operation is completed.

12. In combination, means for feeding and cutting a strip of paper to form a blank, means for bending one edge of the blank out of the plane of the blank and then into substantial juxtaposition with an adjacent edge of the blank, and means under spring tension tending, during said bending, to move a central portion of the blank out of said plane in a direction opposite to that of the initial movement of said first-mentioned edge.

13. In a paper cup making machine: means to feed forward a strip of paper, cup forming mechanism, a chute to receive a finished cup, and a spring urged guide and ejecting finger adapted to be brought into position over the advancing strip and to eject a finished cup into the chute.

14. In a paper cup making machine: means to feed forward a strip of paper, cup forming mechanism including bending means for the paper, a chute to receive a finished cup, a spring urged guide and ejecting finger adapted to be brought into position over the advancing strip and to eject a finished cup into the chute, and means controlled by the movement of the bending means to position said guide and ejecting finger.

15. In a paper cup making machine: means to feed forward a strip of paper, cup forming mechanism including bending means for the paper, a chute to receive a finished cup, a spring urged guide and ejecting finger adapted to be brought into position over the advancing strip and to eject a finished cup into the chute, means controlled by the movement of the bending means to move the same into a position directed toward the advancing strip of paper, and means to provide a spring tension on said finger.

16. In a paper cup making machine: means to feed forward a strip of paper, cup forming mechanism including bending means for the paper, a chute to receive a finished cup, a spring urged guide and ejecting finger adapted to be swung over the advancing strip and to eject a finished cup into the chute, a rod carrying said finger and a bearing in which said rod is mounted to oscillate, an arm attached to said rod, a lever member, a link connected at one end to said arm and at the other with one arm of said lever, a spring acting on the free end of said lever and means actuated by the movement of the bending means for engaging said spring arm of the said lever to control the movement of the said guide and ejecting finger.

17. In a paper cup making machine: means to feed forward a strip of paper, cup forming mechanism including bending means for the paper, a chute to receive a finished cup, a spring, a guide and ejecting finger adapted to position over the advancing paper strip and to be acted on by said spring to press upon the blank for the cup previously to the completion of a cup therefrom, said finger being within the interior of the completed cup after the blank is bent over, and the said spring then being free to act upon the guiding and ejecting finger to forcibly cause it to eject the cup into said chute when released from the cup forming mechanism.

18. In a paper cup making machine of the character set forth comprising operating mechanism for effecting the manufacture of a cup, the combination of means to bind the paper edges with a pliable metal strip and comprising a pair of movable jaws, a toothed tucker member adapted to be inserted therebetween, and a cooperating anvil member for engagement with the tucker member.

19. In combination with means for feeding and cutting a strip of paper and a strip of perforated metal, and means for bending the cut paper to form a cup and for bending and applying the metal strip to edges of the bent paper, of means adapted to flatten spaced portions of the edge of the paper and of the edge of the metal to lock the metal in place.

20. In a paper cup making machine of the character set forth comprising operating mechanism for effecting the manufacture of a cup, the combination of means to bind the paper edges of the cup with a pliable metal strip and comprising a pair of movable jaws, a toothed tucker member adapted to be inserted therebetween, and a spring urged anvil member for engagement with the tucker member, the upper edges thereof being adapted for engagement with the jaws and when reelased thereby to be advanced under the spring action to forcibly eject the cup therefrom.

21. In a paper cup making machine: cup making mechanism for manufacturing a conically shaped cup of the character set forth, an outlet chute, a pivoted member for retaining a completed cup within the chute, and means to actuate said cup retaining member to release the cup prior to a delivery into the chute of a subsequently manufactured cup.

22. In a paper cup making machine: cup making mechanism for manufacturing a conically shaped cup of the character set forth, and embodying a movable guard adapted to be engaged by the forward edge of a cup located in said chute, and means to raise said guard to permit the cup to fall out of said chute under the action of gravity.

23. In a paper cup making machine: cup making mechanism for manufacturing a conically shaped cup of the character set forth, embodying an angular strip against the inner wall of which the forward bound edge of a completed cup within the chute is adapted to rest in inverted position, means to normally hold the same in position to retain a cup in the chute, said means being pivoted to the chute and provided with a vertical slot, a rod passing thru and movable in said slot, and means controlled by the cup making mechanism to raise and lower said rod.

In testimony whereof I affix my signature.

JOSEPH V. WECKBAUGH.